US006351652B1

(12) United States Patent
Finn et al.

(10) Patent No.: US 6,351,652 B1
(45) Date of Patent: Feb. 26, 2002

(54) MOBILE COMMUNICATIONS SYSTEM AND METHOD UTILIZING IMPULSE RADIO

(75) Inventors: James S. Finn; Ralph Gregory Petroff, both of Huntsville, AL (US); David Ernest Hilliard, McLean, VA (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/436,235

(22) Filed: Nov. 9, 1999

Related U.S. Application Data

(60) Provisional application No. 60/161,356, filed on Oct. 26, 1999.

(51) Int. Cl.$^7$ ................................................. H04B 1/38
(52) U.S. Cl. ........................ 455/552; 455/553; 455/462
(58) Field of Search ............................. 455/552, 553, 455/422, 462, 575; 375/200, 208

(56) References Cited

U.S. PATENT DOCUMENTS

| 4,641,317 A | 2/1987 | Fullerton ........................ 375/1 |
|---|---|---|
| 4,813,057 A | 3/1989 | Fullerton ...................... 375/37 |
| 4,979,186 A | 12/1990 | Fullerton ...................... 375/23 |
| 5,127,042 A | 6/1992 | Gillig et al. ................... 379/59 |
| 5,260,988 A | * 11/1993 | Schellinger et al. ........ 455/552 |
| 5,363,108 A | 11/1994 | Fullerton ...................... 342/27 |
| 5,659,598 A | * 8/1997 | Byrne et al. ................. 455/553 |
| 5,677,927 A | 10/1997 | Fullerton et al. ........... 375/200 |
| 5,687,169 A | 11/1997 | Fullerton ..................... 370/324 |
| 5,767,790 A | 6/1998 | Jovellana ................ 340/870.02 |
| 5,832,035 A | 11/1998 | Fullerton ..................... 375/210 |
| 5,870,673 A | * 2/1999 | Haartsen ..................... 455/553 |
| 6,167,278 A | * 12/2000 | Nilssen ........................ 455/462 |

OTHER PUBLICATIONS

Macleod, H.A., *Thin–Film Optical Filters*, Second Edition, 1986, Macmillan Publishing Company, (copy of entrie book provided).

* cited by examiner

*Primary Examiner*—Nay Maung
*Assistant Examiner*—Quochien B. Vuong
(74) *Attorney, Agent, or Firm*—Sterne, Kessler, Goldstein & Fox PLLC

(57) ABSTRACT

A method and apparatus for wireless communication and more particularly, a method and apparatus for wireless communication utilizing impulse radio wherein an impulse radio communication system integrates with existing cellular/PCS wireless communication systems and/or current land line communication systems.

13 Claims, 19 Drawing Sheets

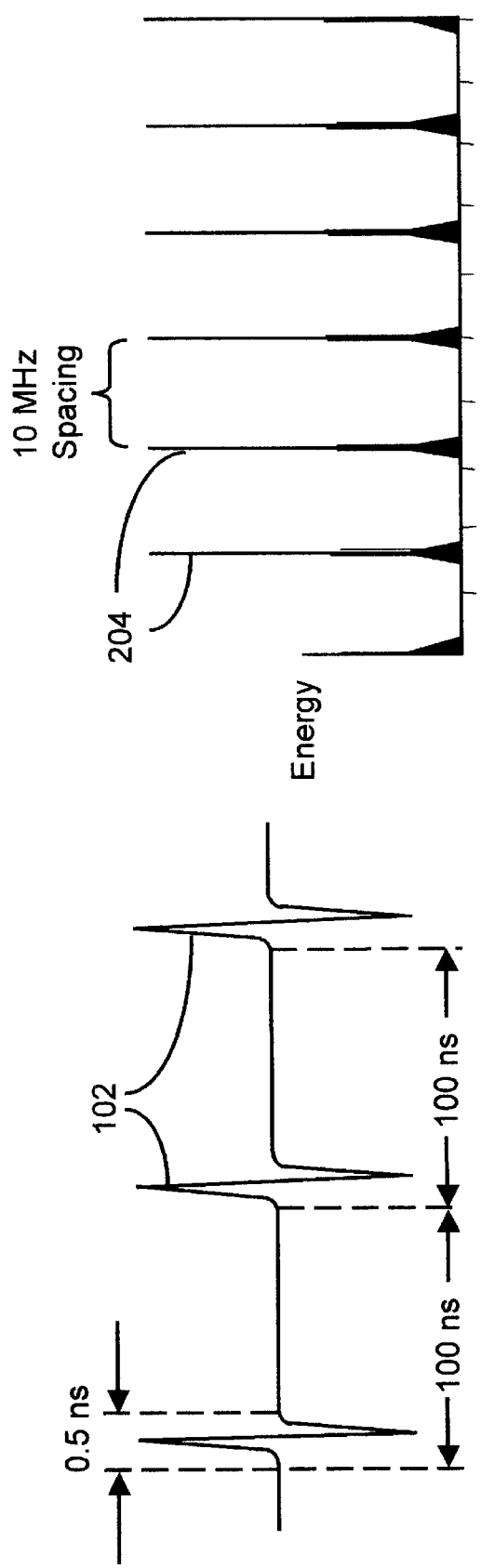
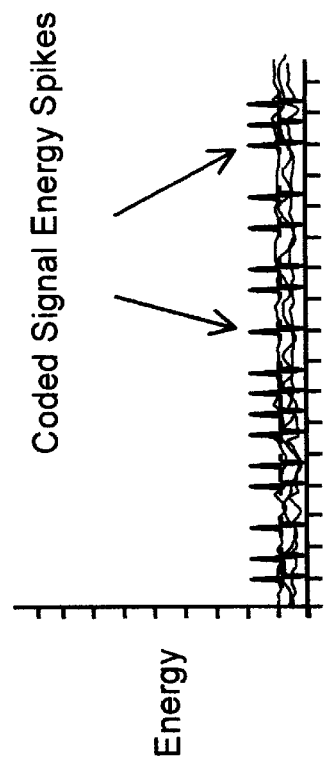
FIG. 2A
FIG. 2B
FIG. 3

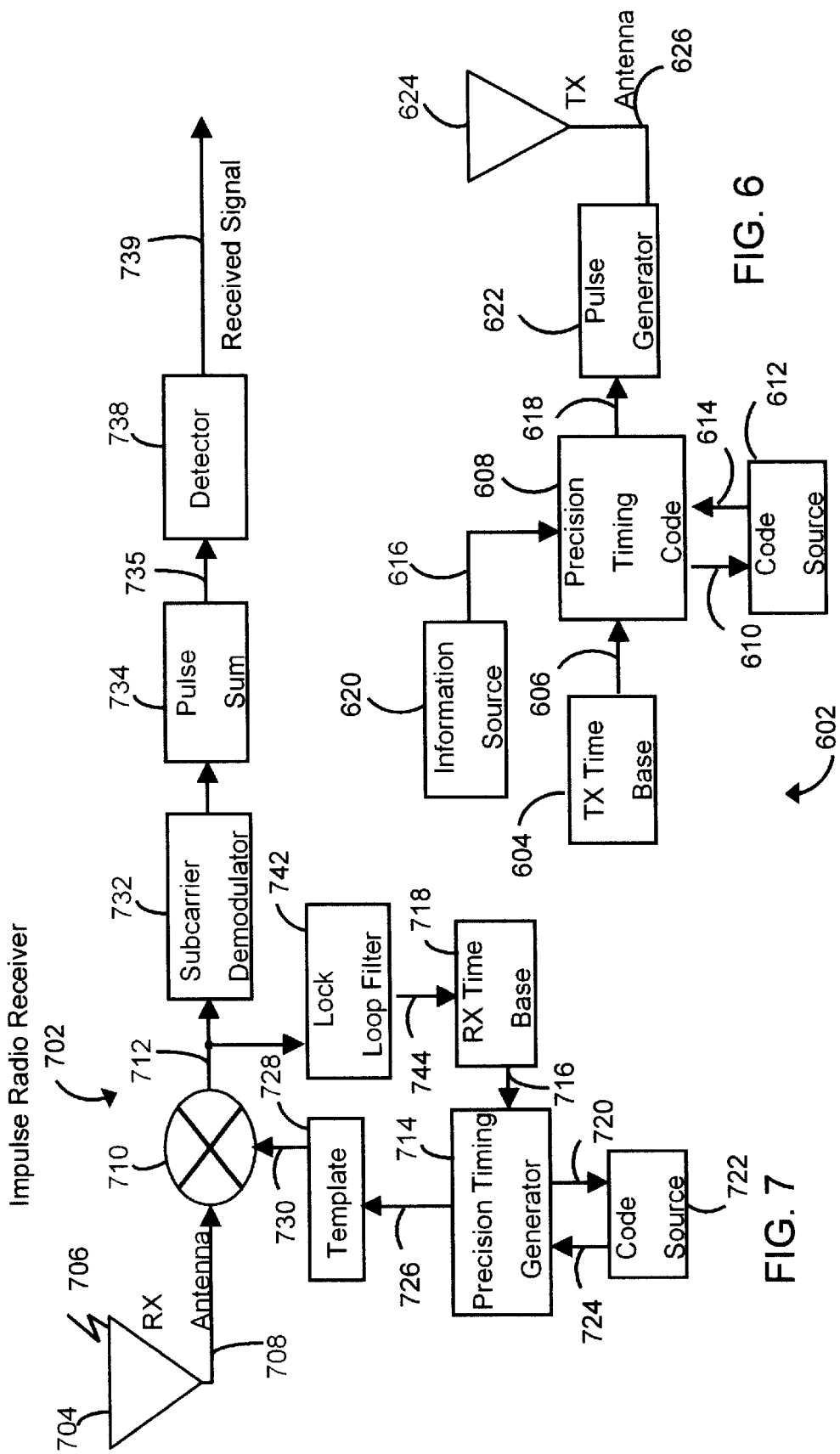

MOBILE COMMUNICATIONS SYSTEM AND METHOD UTILIZING IMPULSE RADIO

CROSS-REFERENCE TO RELATED APPLICATIONS

This application claims the benefit of U.S. Provisional Application No. 60/161,356, filed Oct. 26, 1999.

BACKGROUND OF THE INVENTION

1. Field of the Invention

The present invention relates generally to a method and apparatus for wireless communication. More particularly, the present invention provides a method and apparatus for wireless communication utilizing impulse radio wherein an impulse radio communication system integrates with existing cellular/PCS wireless communication systems and/or current land line communication systems.

2. Background of the Invention and Related Art

The demand for the ability to communicate voice and data in a mobile manner, not confined by the wires or fiber cables of non-wireless communication means, is ever increasing. Technology has improved in order to meet this demand, however, the current state of the art falls dramatically short in many important areas.

As anyone who has ever made a wireless call, whether it be from a "cordless phone" directly attached to land lines (land lines typically being twisted copper pairs and more recently fiber optic cables) or from a cellular/PCS phone, can attest to, the communication can be very unreliable. When using cordless phones, there is a severe limit on distance; further, quality can become a issue because of the multipath environment typical of most wireless communications. It is not uncommon to simply be "dropped" from the communication or to hear "noise" as you talk. Further, there are a limited number of channels that can be achieved because of frequency limitations. This inherently limits the number of users in a given area.

A response to communication disruptions caused by problematic multipath environments has been to increase the transmit power. Previously the main problem with increasing transmit power was that in mobile communications, battery power is typically used. Therefore by increasing power, the battery life is diminished, thereby decreasing the mobility of the user (which is the primary purpose of wireless communications.) However, new studies have shown an even greater problem with existing cellular/PCS and wireless communication systems: it has been shown that the nonionizing electromagnetic radiation released by current wireless communications poses serious health threats to users—to include cancer and brain tumors. Exacerbating this problem is the fact that power increases to overcome multipath problems cause an even greater health risk.

Thus, a great need exists in the wireless voice and data communication industry for a wireless communication means that not only overcomes many of the multipath problems associated with existing wireless communications, but does so at transmission power levels that diminish the health concerns now associated with existing wireless communications means.

As new technologies emerge, it is very important that they are capable of being integrated into existing technologies since vast amounts of resources are typically required to develop infrastructures. Such is especially the case for voice and data communications. Immense networks have been developed on both the wireless and wired fronts. Hundreds of thousands of miles of twisted copper pair and fiber optic cables have been laid throughout the world. Cellular and PCS base stations have been linked throughout the world and satellite communications are also integrated. Integration of some existing technologies has been accomplished; such as in U.S. Pat. No. 5,127,042, entitled, "Cellular cordless telephone", to Gillig etal. Gillig teaches integrating a cellular telephone system into an existing wireless telephone system. The integration of these two distinct systems accomplished its stated purpose, to wit, automatic transfer from the more expensive and less reliable, but more ubiquitous, cellular system to a more reliable and less expensive cordless system whenever practical. However, it does not accomplish a goal of diminishing the reliability and health concerns of both of the systems it is integrating.

Thus, not only is there a need to develop a wireless communication system that overcomes many of the multipath problems associated with existing wireless communications and at an extremely lower power level, but also to be able to integrate that system into existing communication technologies.

SUMMARY OF THE INVENTION

It is therefore an object of the present invention to provide a novel wireless voice and data communication means.

It is another object of the present invention to provide a wireless voice and data communication means which utilizes very low transmit powers.

It is a further object of the present invention to provide a wireless voice and data communication means which overcomes multipath problems associated with wireless transmissions.

It is another object of the present invention to provide a wireless voice and data communication means which utilizes very low transmit powers and overcomes multipath problems associated with wireless transmissions and integrates into existing voice and data communication infrastructures.

These and other objects are provided, according to the present invention, by a method and apparatus for wireless communication utilizing impulse radio, wherein an impulse radio communication system either stands alone or integrates with existing cellular/PCS wireless communication systems and/or current land line communication systems.

BRIEF DESCRIPTIONS OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 2A illustrates a pulse train comprising pulses as in FIG. 1A;

FIG. 2B illustrates the frequency domain amplitude of the waveform of FIG. 2A;

FIG. 3 illustrates the frequency domain amplitude of a sequence of time coded pulses;

Figures 5A, 5B:
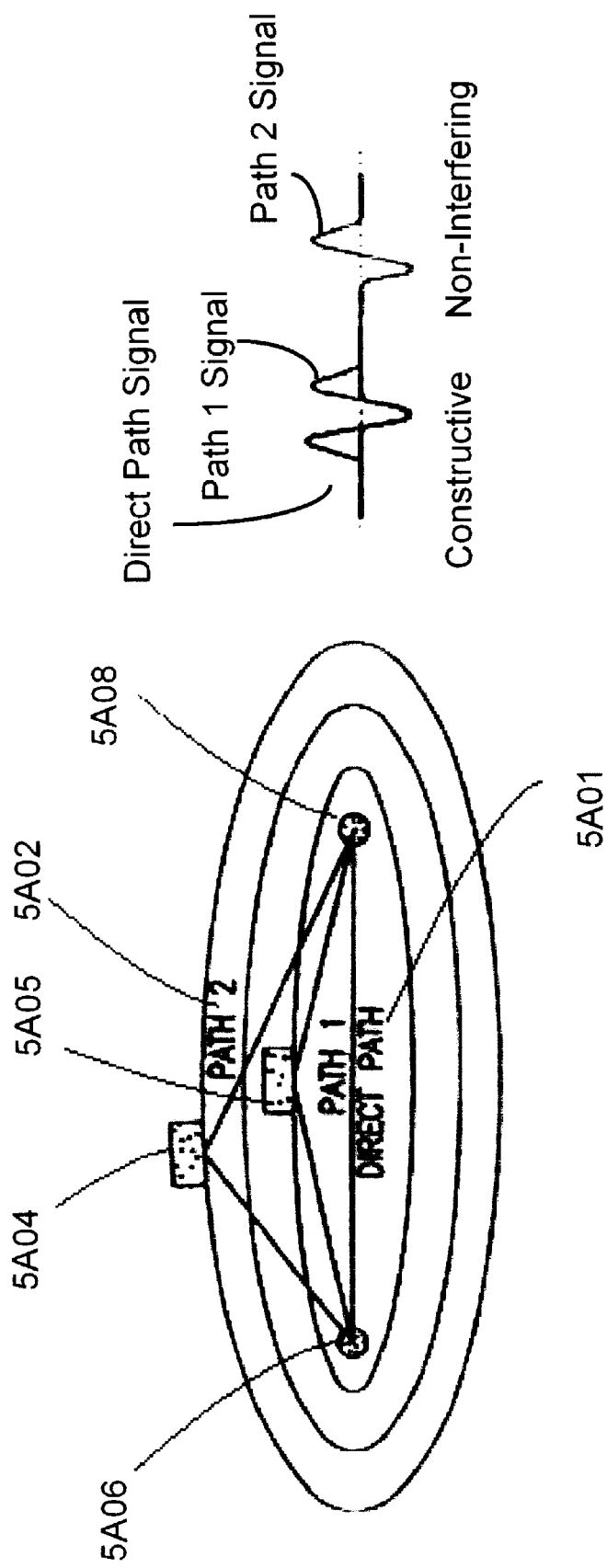
FIG. 5A illustrates a typical geometrical configuration giving rise to multipath received signals.
FIG. 5B illustrates exemplary multipath signals in the time domain.
Figure 5C:
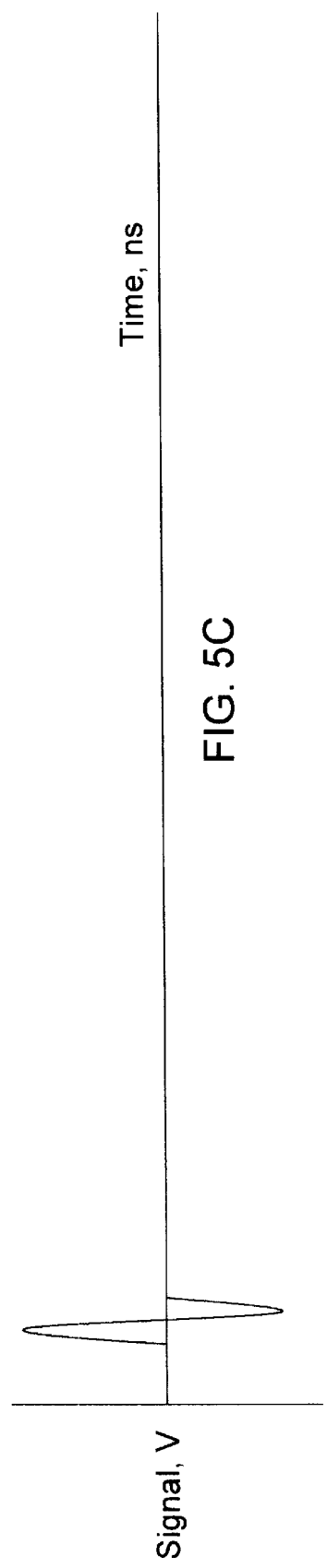
FIGS. 5C–5E illustrate a signal plot of various multipath environments.
Figure 5D:
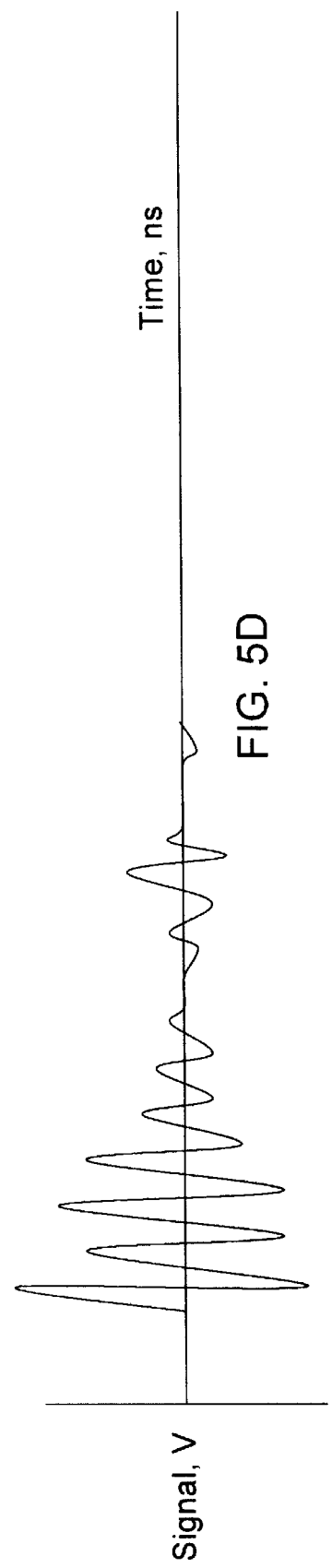
Figure 5E:
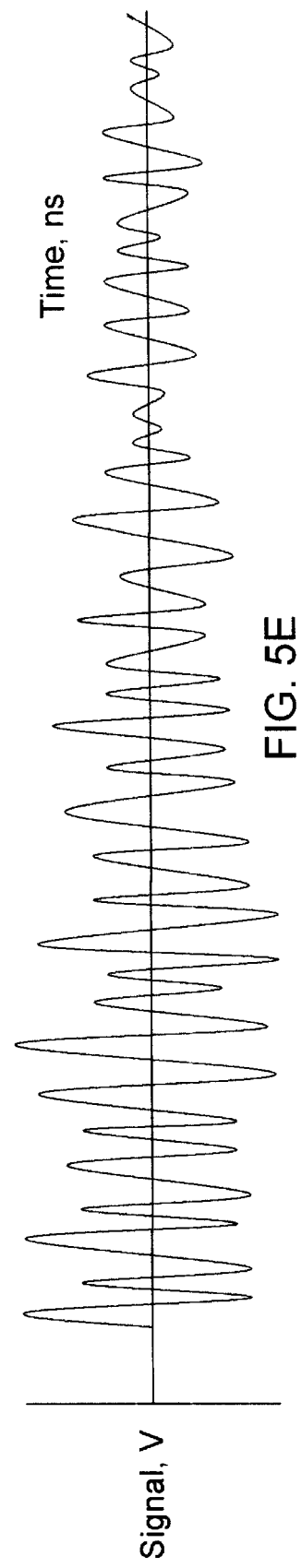
Figure 5F:
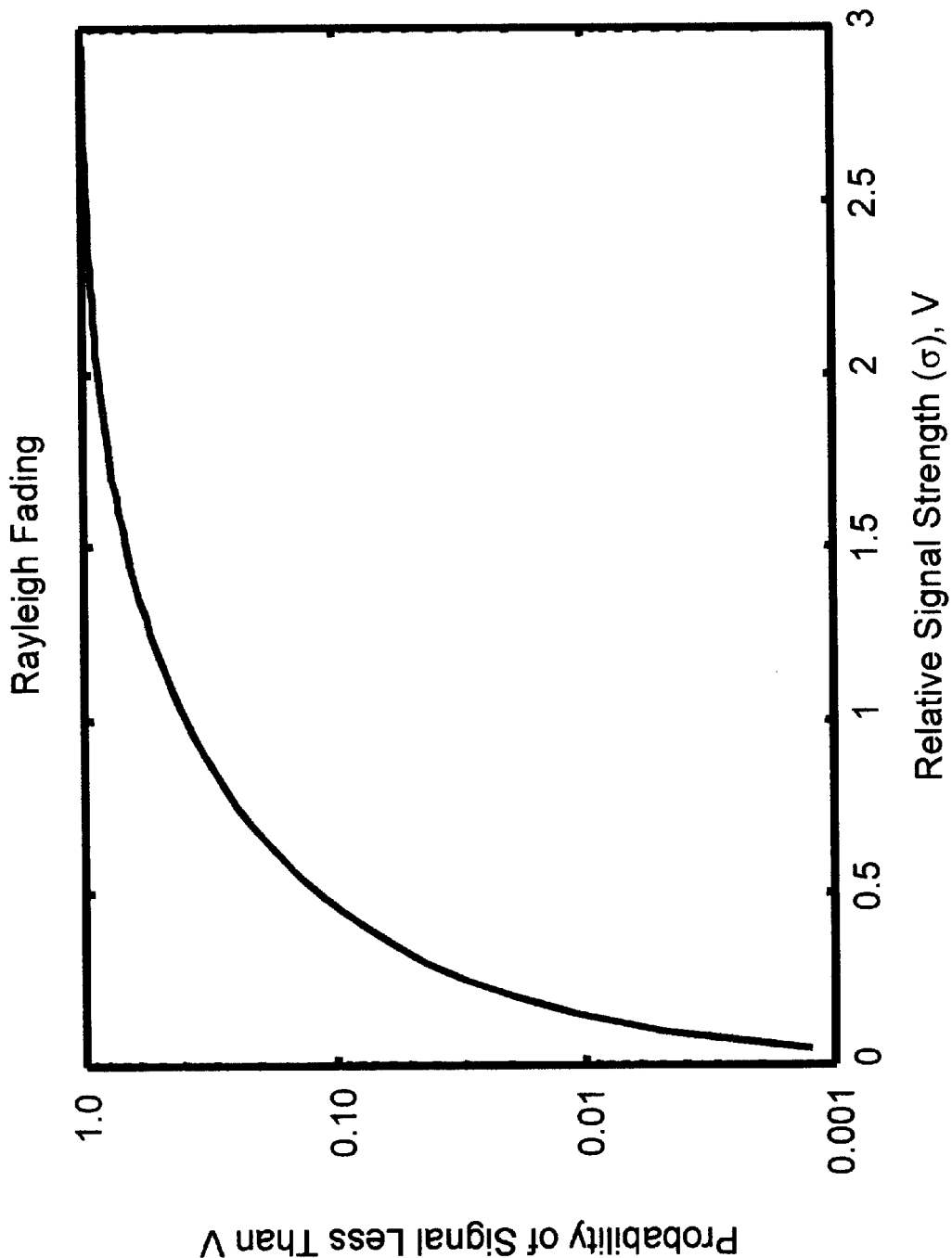
FIG. 5F illustrates the Rayleigh fading curve associated with non-impulse radio transmissions in a multipath environment.
Figure 5G:
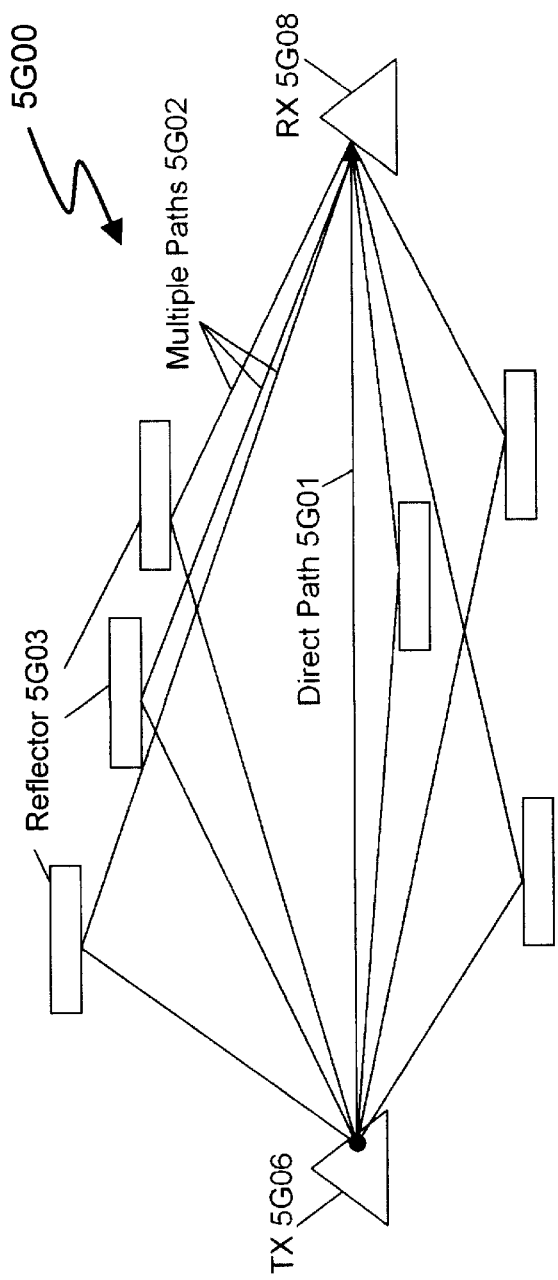
FIG. 5G illustrates a plurality of multipaths with a plurality of reflectors from a transmitter to a receiver.
Figure 5H:
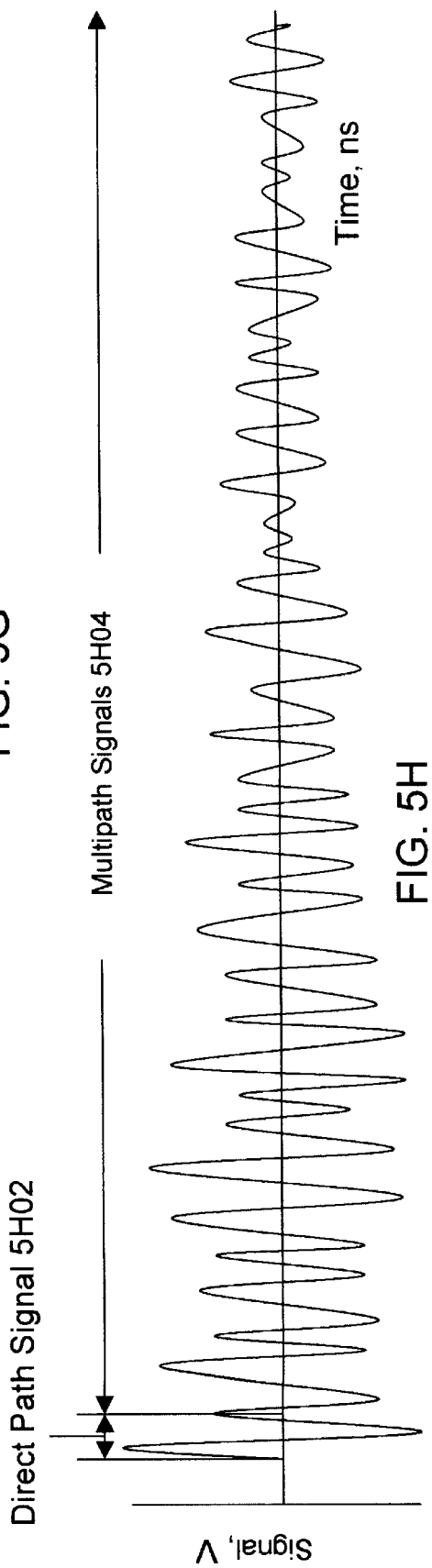

FIG. 5H graphically represents signal strength as volts vs. time in a direct path and multipath environment.

Figure 8A:
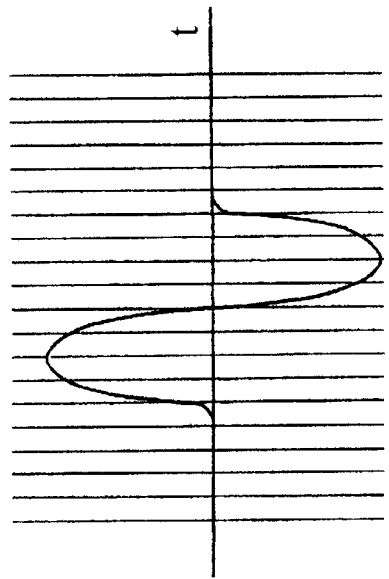
Figure 8B:
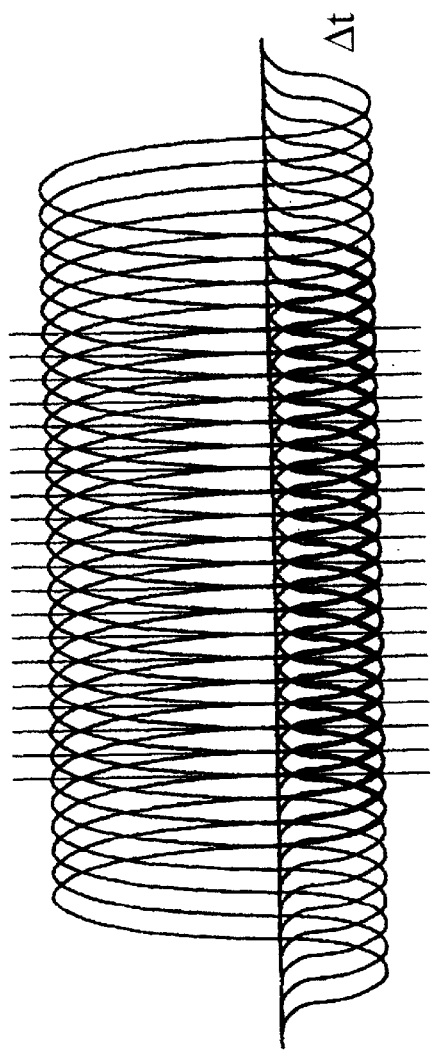
Figure 9:
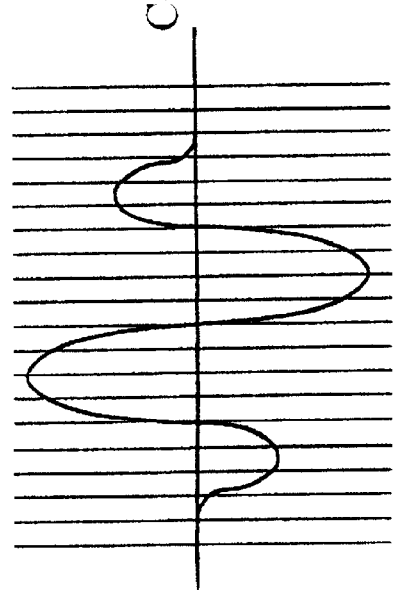
Figure 10:
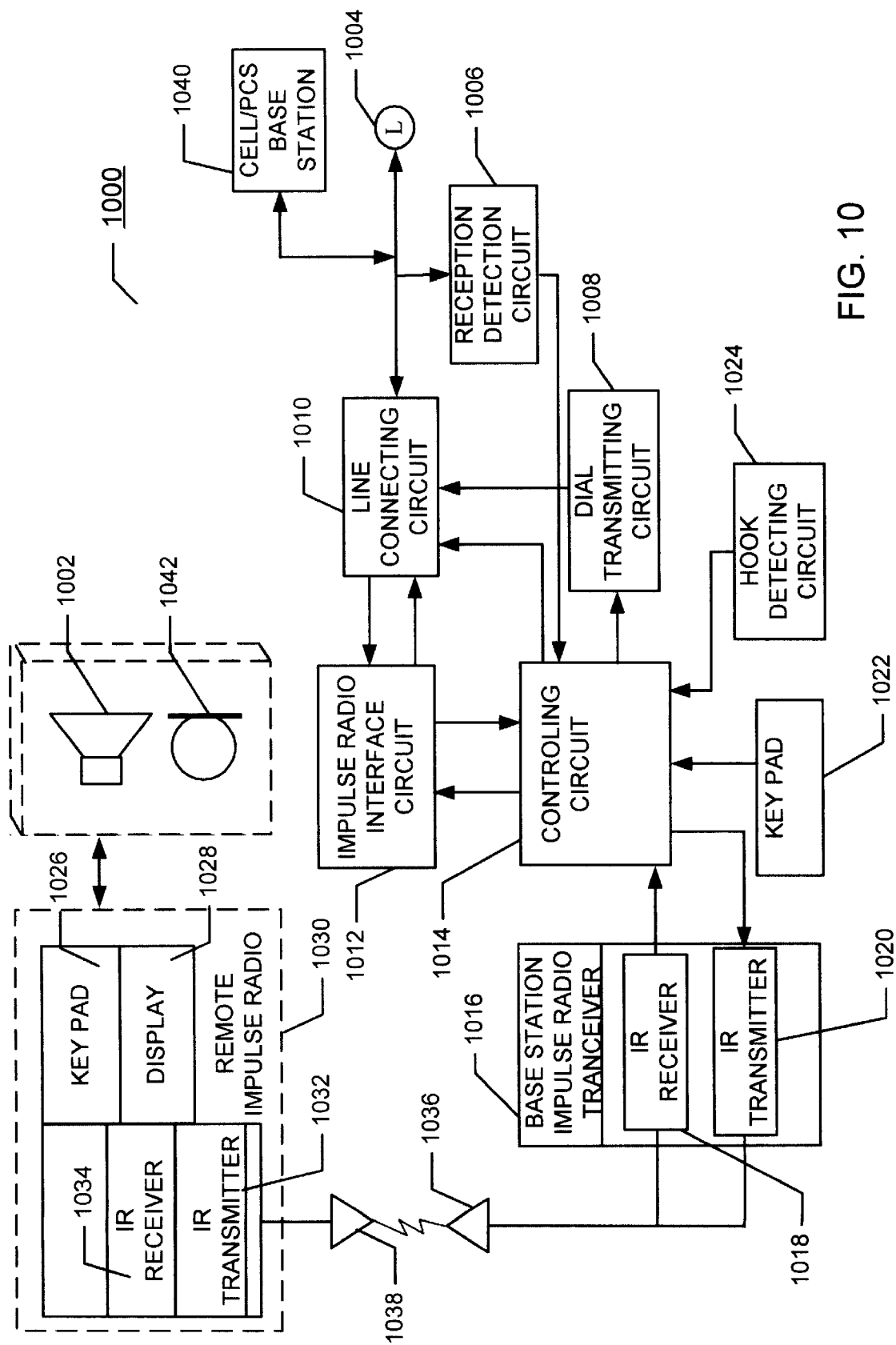

FIG. 6 illustrates a representative impulse radio transmitter functional diagram;

FIG. 7 illustrates a representative impulse radio receiver functional diagram;

FIG. 8A illustrates a representative received pulse signal at the input to the correlator;

FIG. 8B illustrates a sequence of representative impulse signals in the correlation process;

FIG. 9 illustrates the potential locus of results as a function of the various potential template time positions;

FIG. 10 is a block diagram illustrating the interface of standard telephone lines into an impulse radio base station.

Figure 11:
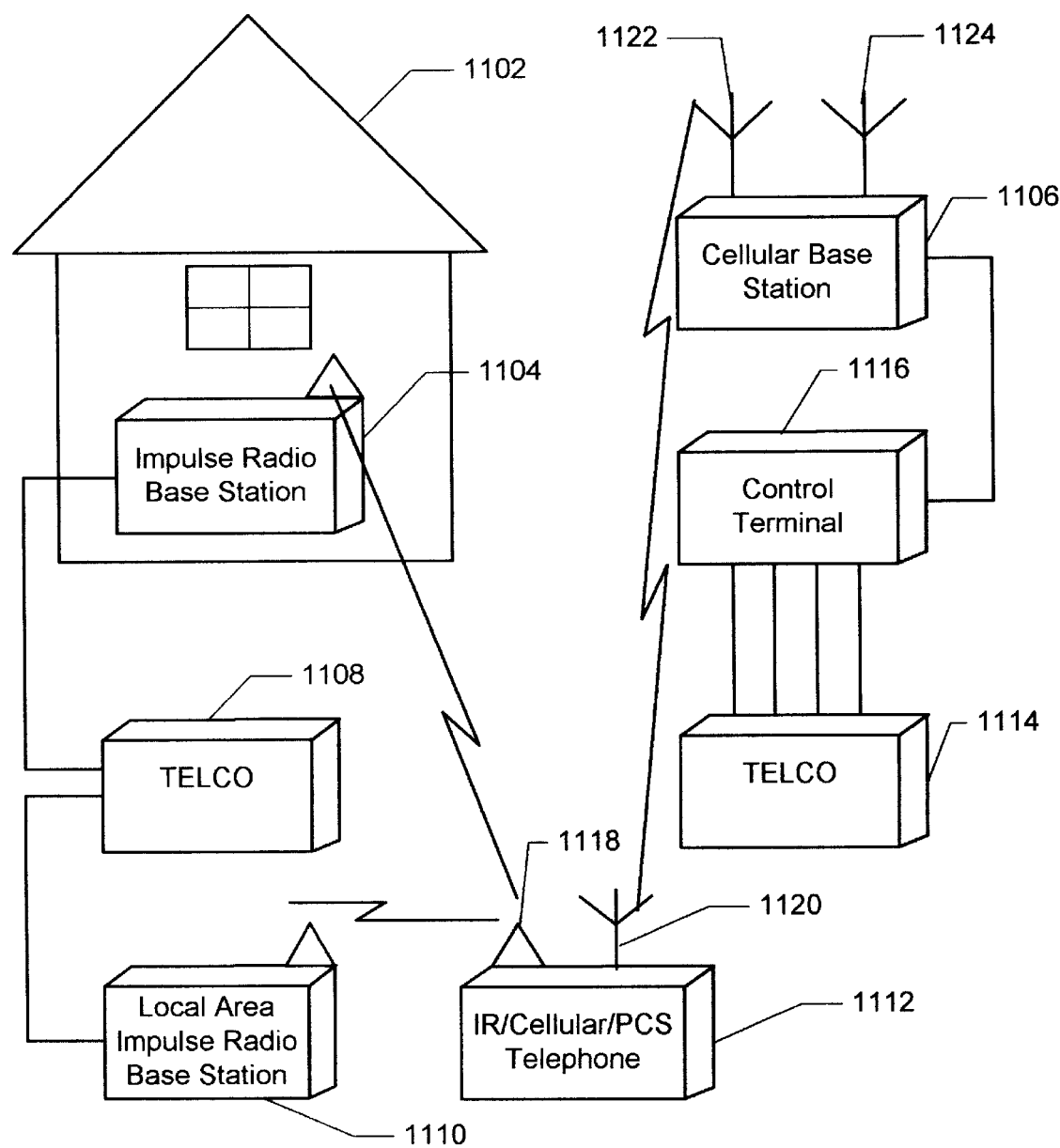

FIG. 11 is a block diagram of an impulse radio cellular telephone (IRCT) system embodying the present invention.

Figure 12:
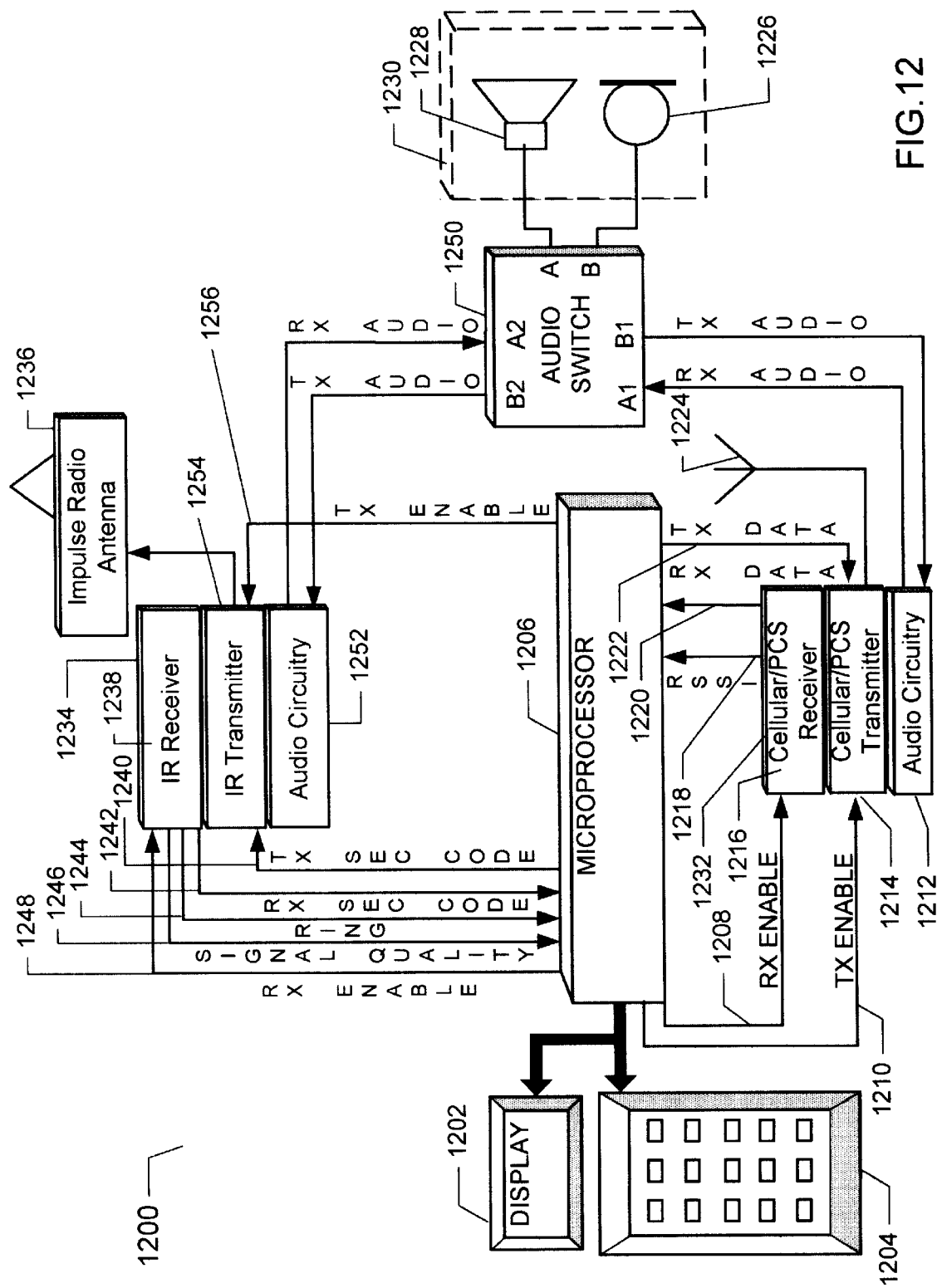

FIG. 12 is a block diagram of an impulse radio cellular telephone embodying the present invention.

Figure 13:
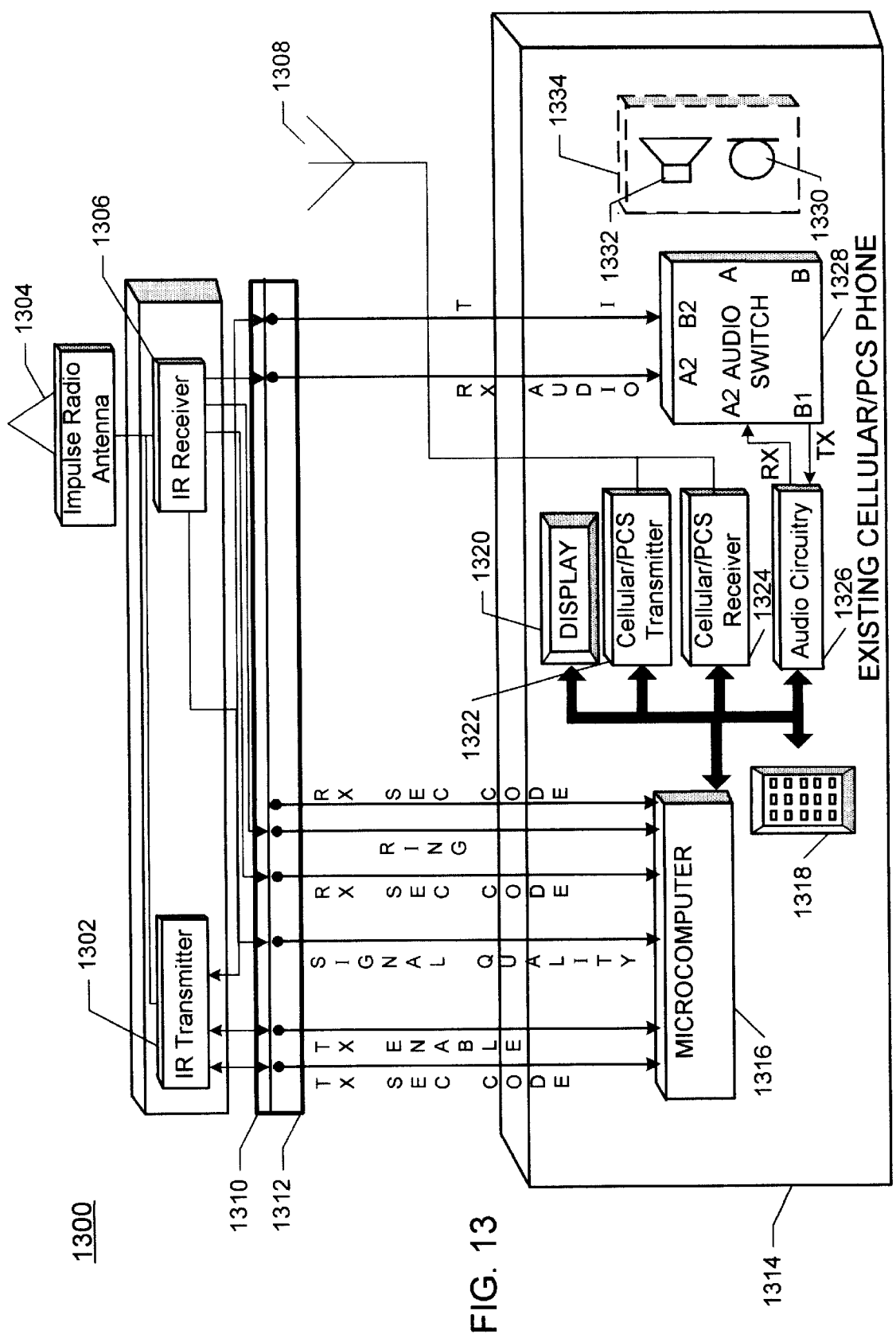

FIG. 13 is a block diagram of another embodiment of an impulse radio cellular telephone according to the present invention.

Figure 14:
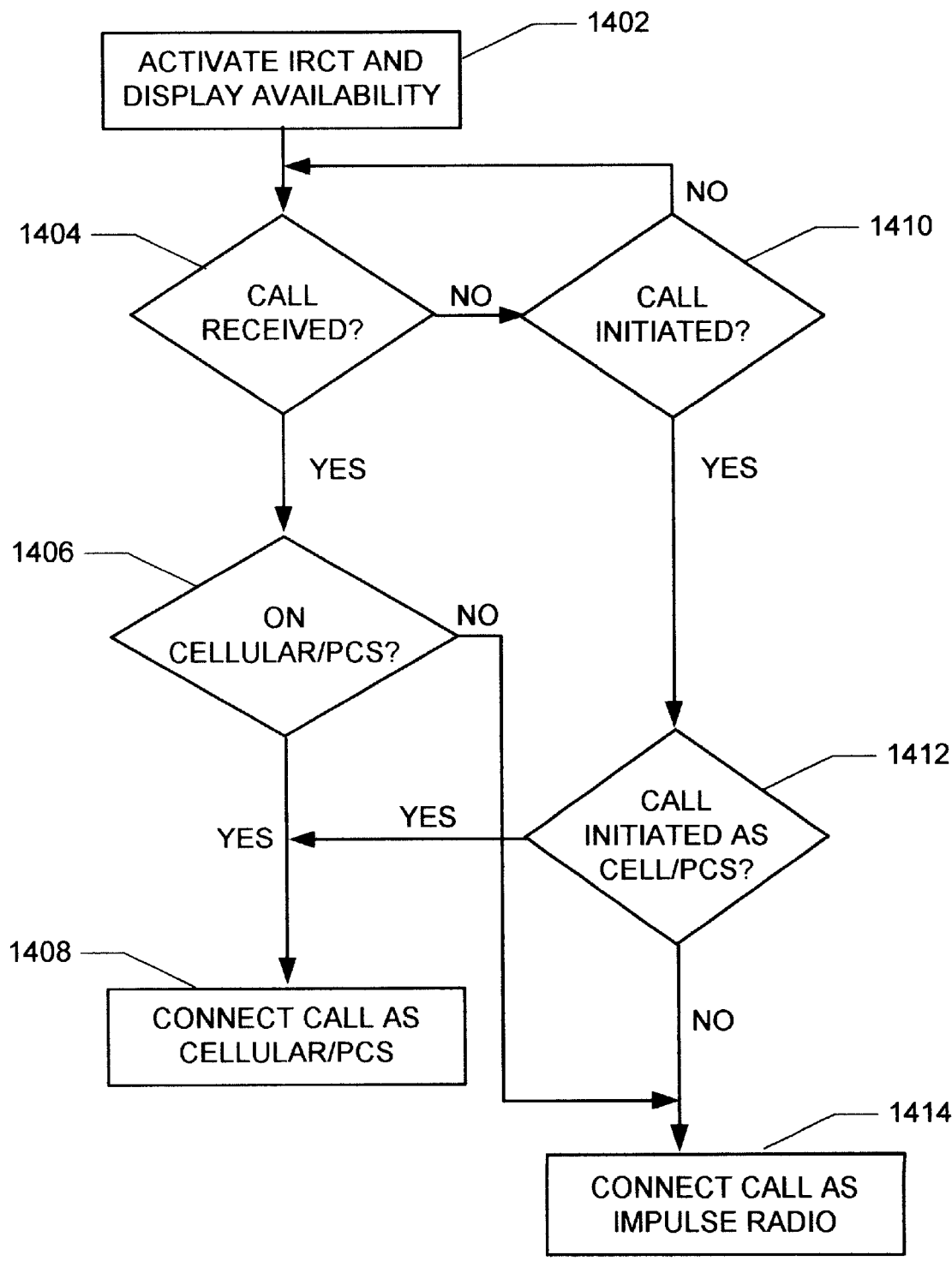

FIG. 14 is a flow chart for the process used by the impulse radio cellular telephones in FIGS. 12 and 13 for placing and receiving cellular and impulse radio telephone calls.

Figure 15:
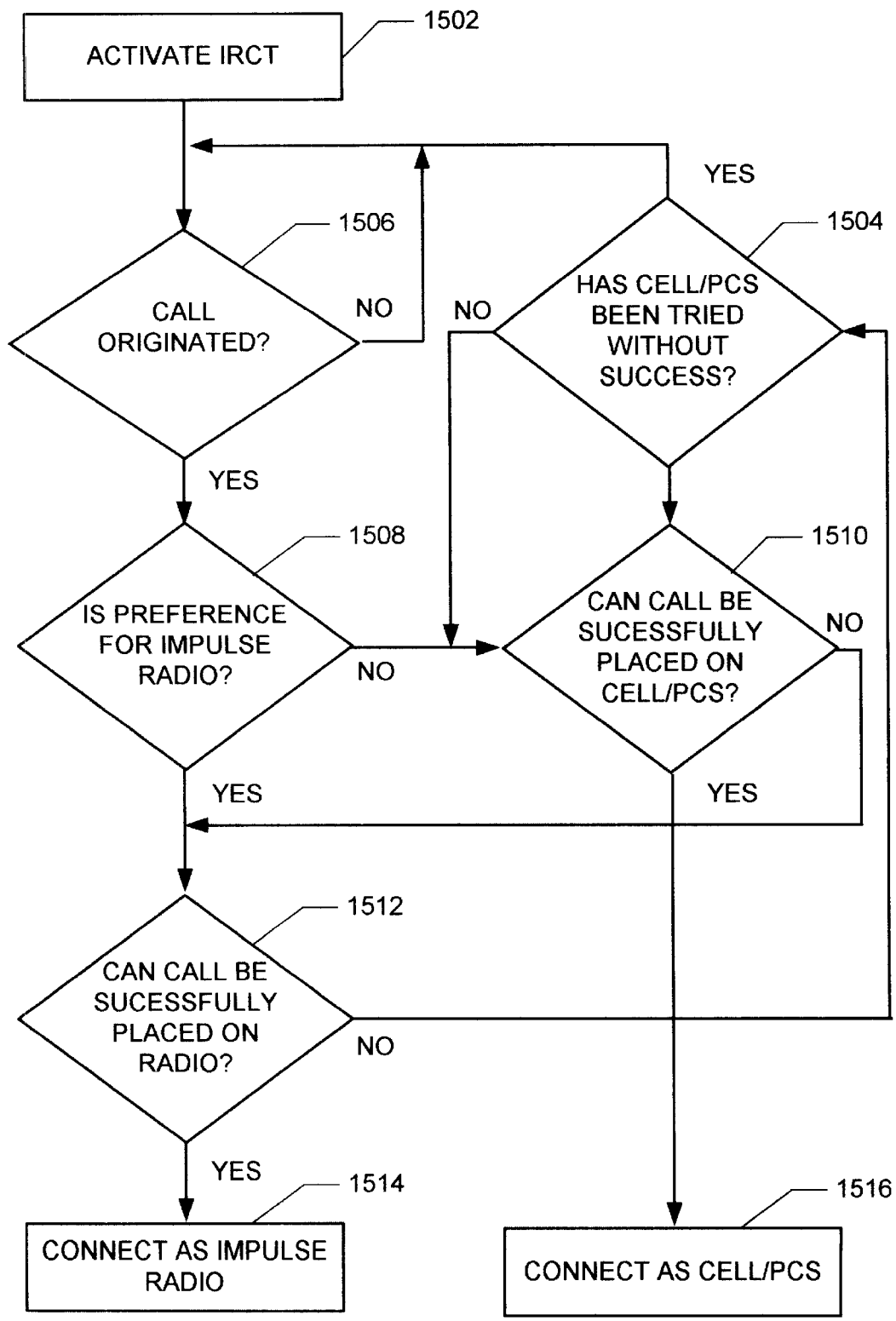

FIG. 15 is a flow chart for the process used by the impulse radio cellular telephones in FIGS. 12 and 13 for originating a telephone call as a cellular telephone call or a impulse radio telephone call according to user selectable preference.

Figure 16:
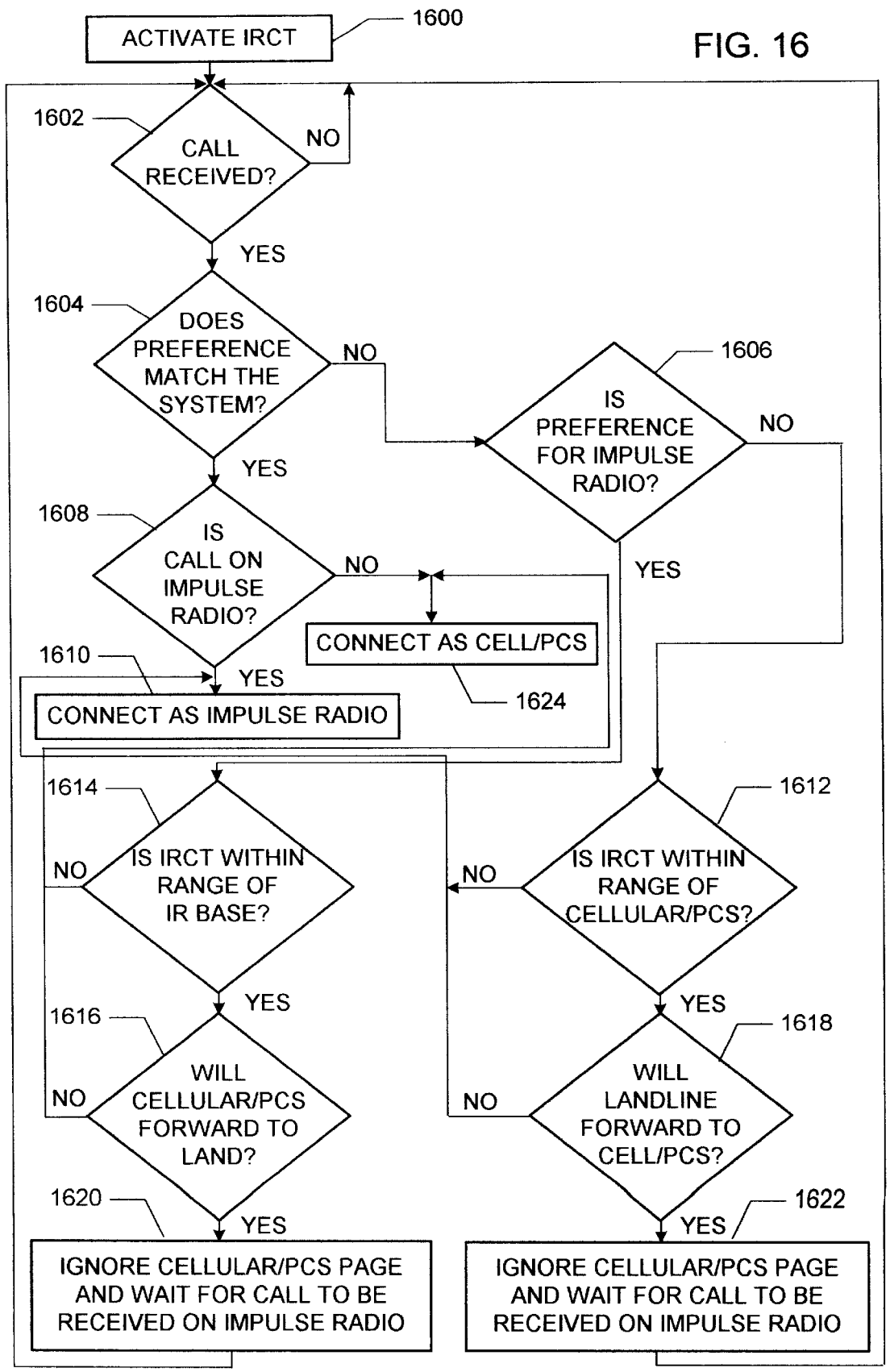

FIG. 16 is a flow chart for the process used by the impulse radio cellular telephones in FIGS. 12 and 13 for receiving a telephone call as a cellular telephone call or a impulse radio telephone call according to user selectable preference.

Figure 17:
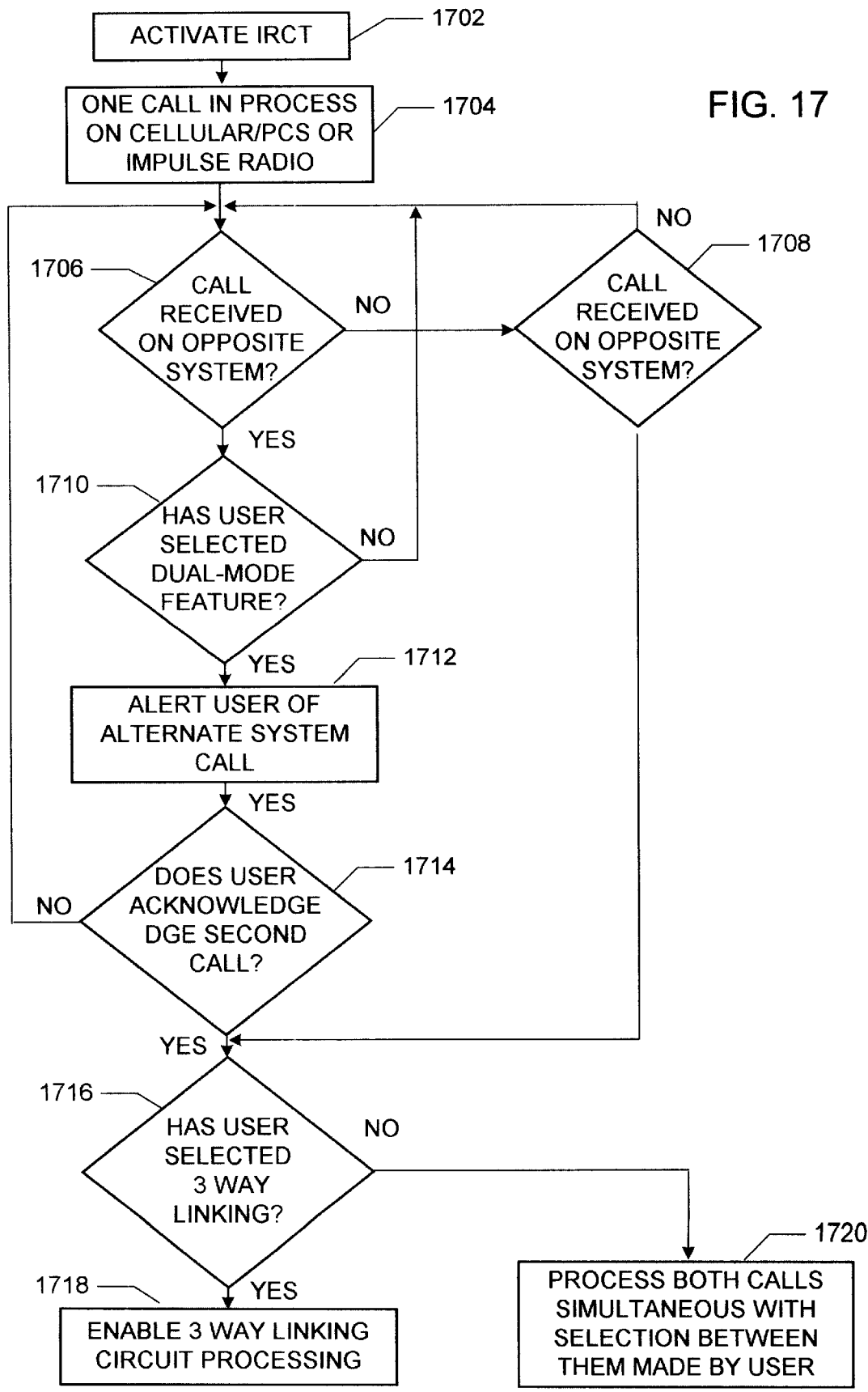

FIG. 17 is a flow chart for the process used by the impulse radio cellular telephones in FIGS. 12 and 13 for simultaneously processing both a cellular telephone call and a impulse radio telephone call and three-way linking both calls.

Figure 18:
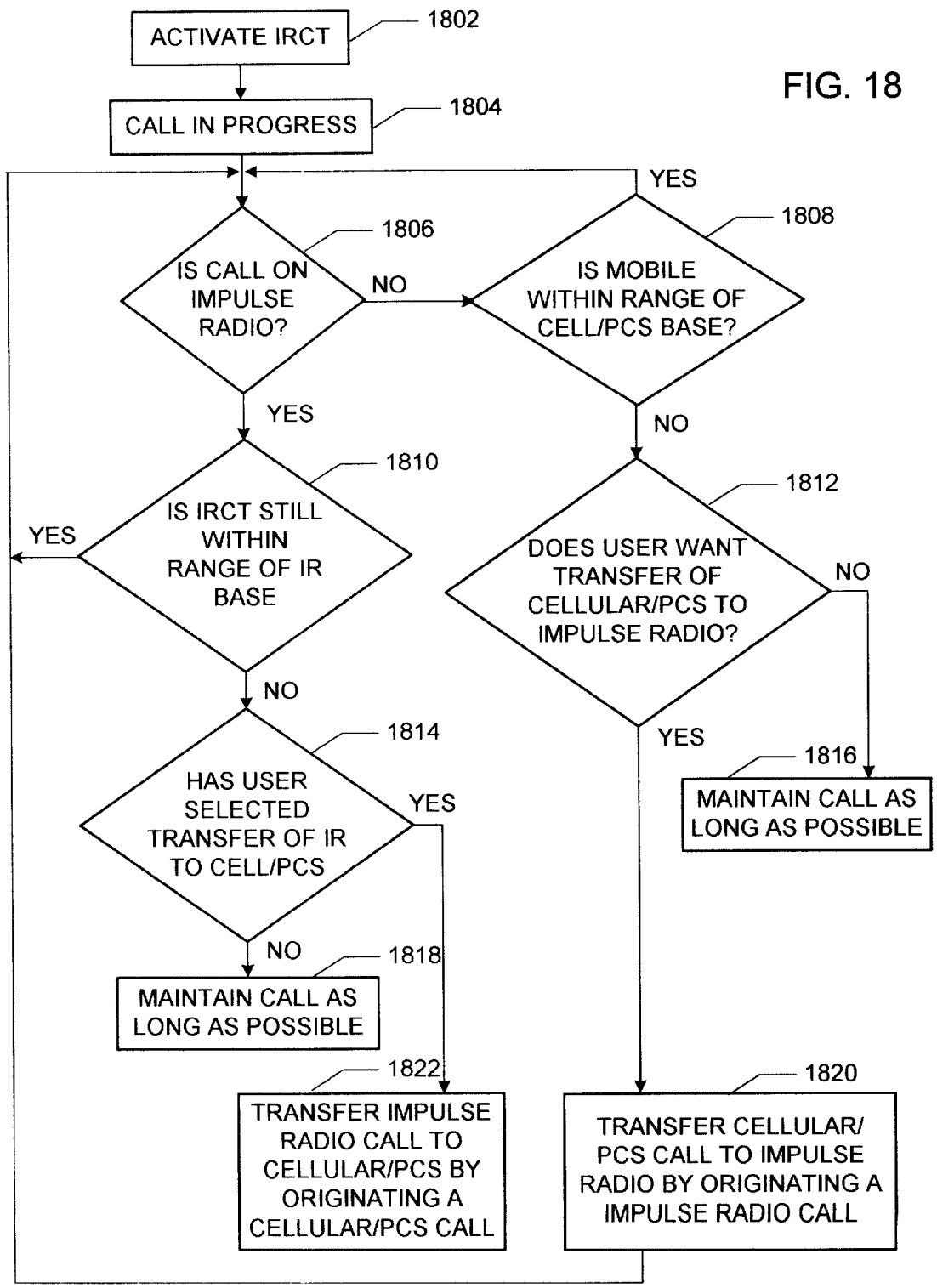

FIG. 18 is a flow chart for the process used by the impulse radio cellular telephones in FIGS. 12 and 13 for automatically transferring between a cellular telephone call and a impulse radio telephone call.

Figure 19:
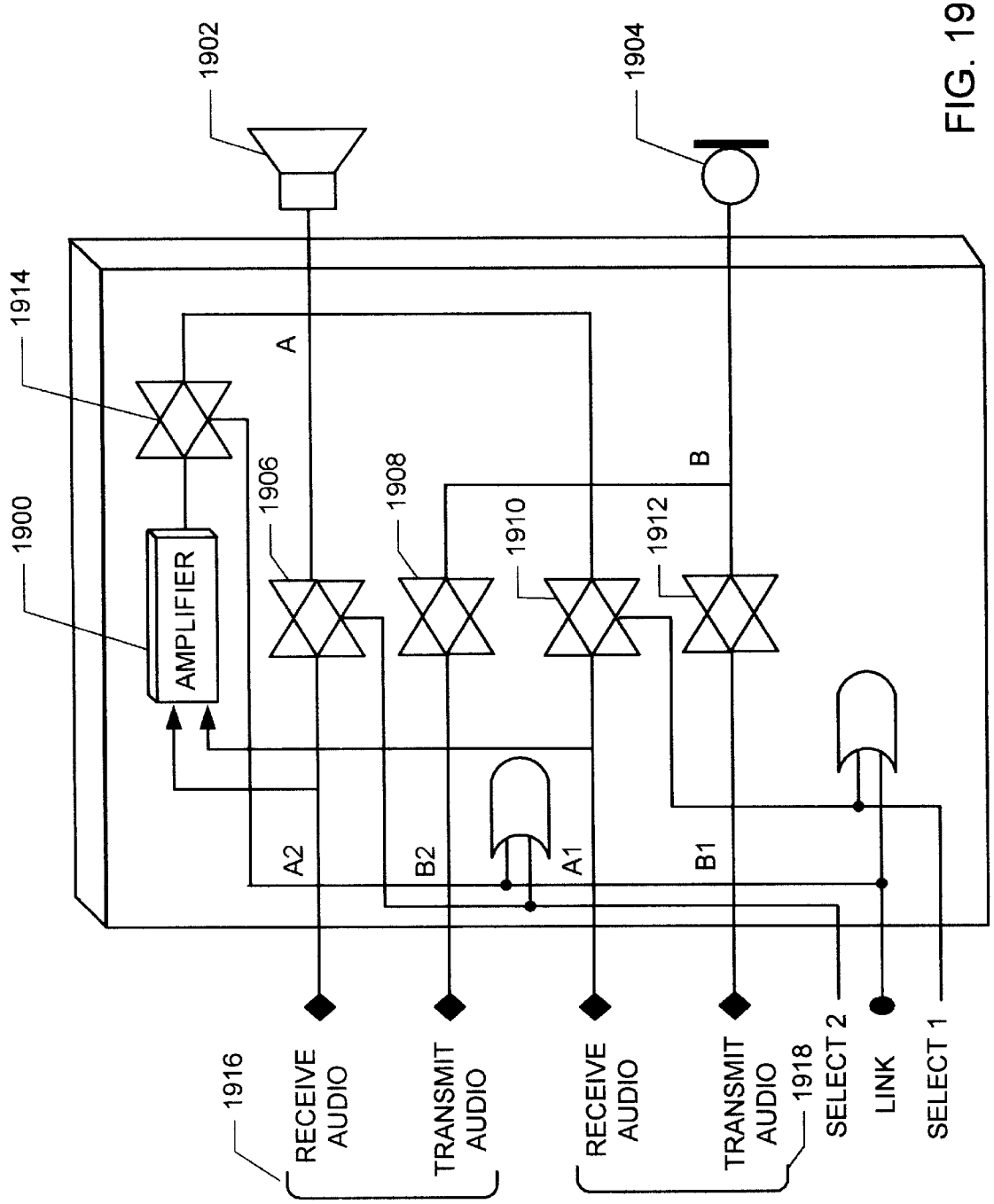

FIG. 19 is a block diagram of audio switch 150 in the impulse radio cellular telephone in FIG. 12

DETAILED DESCRIPTION OF THE EMBODIMENTS

Overview of the Invention

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996) to Fullerton et al.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed on Jun. 14, 1999 and both of which are assigned to the assignee of the present invention. These patent documents are incorporated herein by reference.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1B:
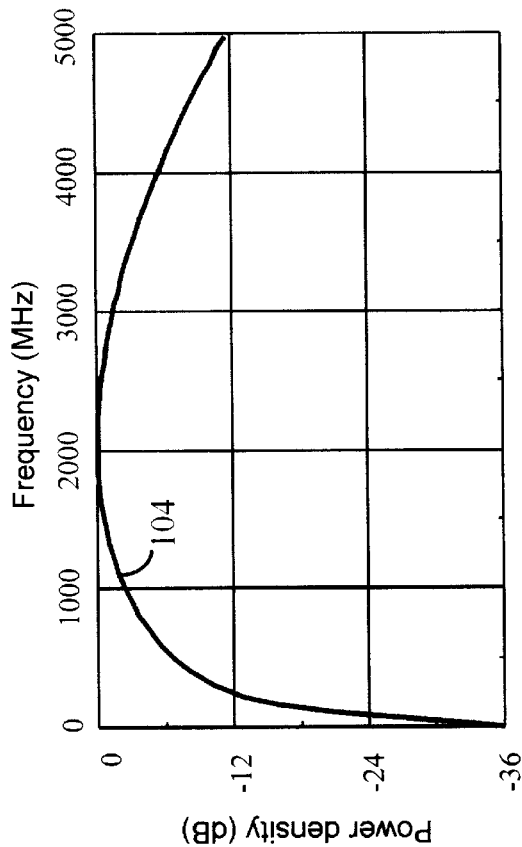
FIG. 1B illustrates the frequency domain amplitude of the Gaussian Monocycle of FIG. 1A.
Figure 1A:
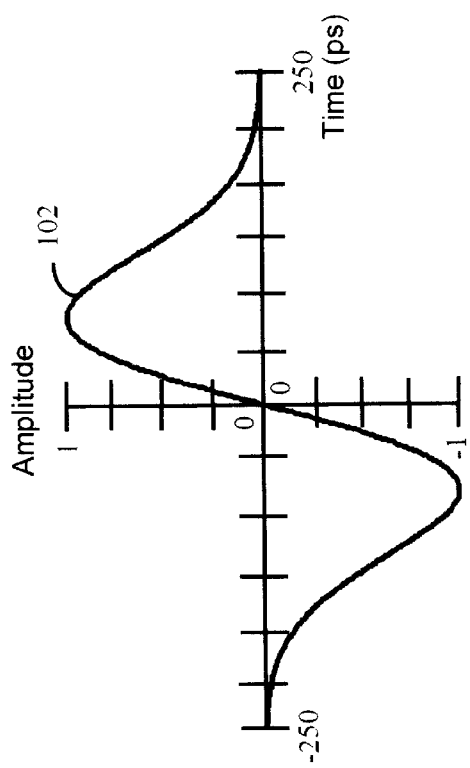
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band. It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
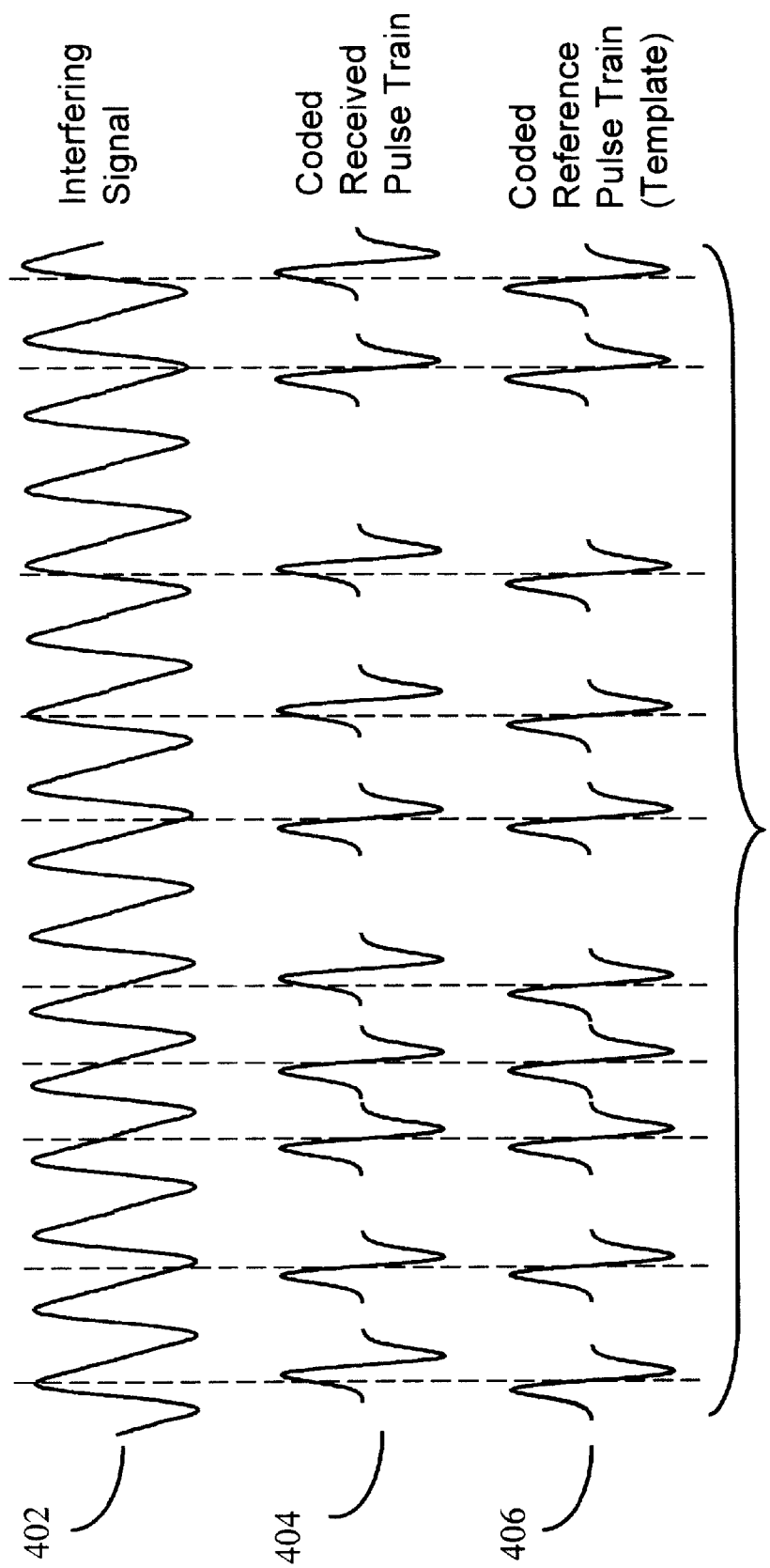
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined mulitpath signals.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by In phase and Quadrature Signals in a Radio System", both of which are incorporated herein by reference.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8–10 illustrate the cross correlation process and the correlation function. FIG. 8 shows the waveform of a template signal. FIG. 8B shows the waveform of a received impulse radio signal at a set of several possible time offsets. FIG. 9 represents the output of the correlator (multiplier and short time integrator) for each of the time offsets of FIG. 8B. Thus, this graph does not show a waveform that is a function of time, but rather a function of time-offset. For any given pulse received, there is only one corresponding point which is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, titled "Precision Timing Generator System and Method", both of which are incorporated herein by reference.

Impulse Radio as Used in the Present Invention

As discussed above, when utilized in utility monitoring of the present invention, the characteristics of impulse radio significantly improve the state of the art. In FIG. 10, there is illustrated a block diagram of an impulse radio cellular/PCS telephone system embodying the present invention wherein the impulse radio wireless communication means is interfaced with a land line 1004 or a Cellular/PCS base station 1040. Connected to wired line 1004 or Cell/PCS base station 1040 is a line connecting circuit 1010 which connects to an impulse radio interface circuit 1012. Impulse radio interface circuit interfaces the signals received from either the wired line 1004 or the Cell/PCS base station 1040 and forwards them to controlling circuit 1014. A hook detecting circuit 1024 connected to controlling circuit 1014 detects when remote impulse radio is initiating a transmission or "going offhook". Also connected to controlling circuit 1014 is a reception detection circuit 1006 for detecting when signals are incoming. Controlling circuit 1014 is in communication with and controls signal flow to impulse radio base station 1016 wherein are an impulse radio receiver 1018 and an impulse radio transmitter 1020. If non-remote dialing is required, a local key-pad and display are also interfaced with controlling circuit 1014.

Impulse radio base station 1016 transmits impulse radio transmissions (as described above and in the patents and documents incorporated herein by reference) to the impulse radio transceiver, which includes an impulse radio transmitter 1032 and impulse radio receiver 1034. Both are located in remote impulse radio 1030 wherein are also located key pad 1026 for information input and a display 1028. To transmit and receive voice an audio speaker 1002 and microphone 1042 are also contained in remote impulse radio 1030. Although, the embodiment herein describes voice communication it is understood that the speaker and microphone can be replaced with a data reception device for transmission of data in addition to or in lieu of voice.

FIG. 11 illustrates the system which includes a telephone company phone system (TELCO) 1108, connected by telephone landlines to a impulse radio base station 1104 having a landline telephone number located in a home, office or any designated area 1102 and to a local area impulse radio base station 1110 having a landline telephone number in another office, building, or other geographical location. Impulse radio base stations 1104 and 1110 communicate with the impulse radio cellular/PCS telephone (IRCT) 1112 through antennas 1118 and 1120. Antenna 1118 has a unique design and is utilized as described above and in the documents incorporated herein by reference. Antenna 1120 is a standard antenna utilized in present day cellular/PCS mobile communication systems well known to those skilled in the art. Impulse radio base stations 1104 and 1110 are impulse radio transceivers described above and in the patents incorporated herein by reference. These impulse radio transceivers may be interfaced with TELCO 1108 which is the herein described embodiment; however, it is understood that one skilled in the art could, without undue experimentation, interface the impulse radio transceivers with any communication network. Additional community impulse radio base stations 1110 may be located throughout a metropolitan area for providing shared telephone service to IRCTs 1112. With regards to metropolitan areas a unique feature of impulse radio is its ability to adapt to user requirements. For example, in an area such as New York, the user volume can be enormous. By adding additional correlators in the impulse radio transceivers, a large number of users can simultaneously transmit to the impulse radio base station. This would be impossible for prior wireless or cordless systems. The ability to add correlators to impulse radio receivers is described above and in the impulse radio patents incorporated herein by reference.

Also connected through telephone landlines to the same or a different telephone company phone system (TELCO) 1114 or other communications network is the cellular control terminal 1116, the use and implementation of which are described in U.S Pat. No. 4,268,722 and are incorporated herein by reference, with its associated cellular base station (s) 1106, the use and implementation of which are described in U.S. Pat. No. 4,485,486 and is incorporated herein by reference. Cellular base station 1106 incorporates both a receive antenna 1122 and a transmit antenna 1124 (see U.S. Pat. No. 4,369,520 incorporated herein by reference) for communicating with IRCTs 1112.

IRCT 1112 may be a mobile unit installed in a vehicle, a transportable unit which is a mobile unit and battery installed in a carrying case, or a hand-held portable unit. IRCT 1112 includes an antenna 1118 for the impulse radio radio channels and an antenna 1120 for the cellular radio channels as illustrated by the embodiment of IRCT 1300 in FIG. 13. In previous embodiments of systems wherein "cordless" telephones were used, channels are in the frequency band from 46–49 mHz and the cellular radio channels are in the frequency band from 824–894 mHz. However, in impulse radio systems, channels are no longer in the frequency domain but rather are based on psuedorandom codes (as described above and in the herein referenced impulse radio patents and documents). Thus, unlike previous "cordless" systems, the limits on channels available and therefore limits on the number of simultaneous users is not constrained.

In FIG. 12, there is illustrated a detailed block diagram of a first embodiment of a IRCT 1200 according to the present invention. IRCT 1200 includes a impulse radio transceiver 1234, impulse radio antenna 1236, cellular telephone transceiver 1232, antenna 1224, microcomputer 1206, keypad 1204, display 1202, audio switch 1250, and handset 1230 including speaker 1228 and microphone 1226. Impulse radio transceiver 1234 is fully described above and in the impulse radio documents incorporated herein by reference. Cellular telephone transceiver 1232, microcomputer 1206, keypad 1204, and handset 1230 may be any commercially available cellular transceiver, such as, for example, the transceiver shown and described in Motorola instruction manual number 68P81049E55, entitled "DYNATAC Cellular Mobile Telephone", published by and available from Motorola C & E Parts, 1313 East Algonquin Road, Schaumburg, Ill. 60196.

Referring to FIG. 19, audio switch 1250 may be implemented with two-to-one multiplexing analog switches 1906–1912 which select between audio signals of audio circuitry 1916 in impulse radio transceiver 1234 and audio circuitry 1918 in cellular transceiver 1232 under control of select signals SELECT1, SELECT2 and LINK from microcomputer 1206. Select signal SELECT2 enables switches 1906 and 1908 when it has a binary one state, select signal SELECT1 enables switches 1910 and 1912 when it has a binary one state, and select signal LINK enables switches 1908, 1912 and 1914 when it has a binary one state. Depending on which is enabled, analog switches 1906 and 1910 couple speaker 1902 to receive audio from audio circuitry 1252 and audio circuitry 1212, respectively. Similarly, depending on which is enabled, analog switches 1908 and 1912 couple microphone 1904 to transmit audio of audio circuitry 1252 and audio circuitry 1212, respectively. If three-way linking is selected, analog switches 1908 and 1912 couple microphone 1902 to transmit audio of both audio circuitry 1252 and audio circuitry 1212, and analog switch 1914 couples speaker 1902 to receive audio of both audio circuitry 1252 and audio circuitry 1212 by way of summing amplifier 1900.

Referring to IRCT 1200 in FIG. 12, microcomputer 1206 is programmed in accordance with FIGS. 14–18 for operating as a cellular telephone, an impulse radio telephone, or an impulse radio cellular telephone. That is, according to the present invention, IRCT 1200 may simultaneously operate as a cellular telephone and a impulse radio telephone. When operating as a cellular telephone, control signals 1210 TX ENABLE and 1208 RX ENABLE of microcomputer 1206 enable cellular/PCS transmitter 1214 and cellular/PCS receiver 1216, respectively. In addition to control signals 1210 and 1208 to cellular transceiver 1232, microcomputer 1206 also monitors control signals 1218 RSSI, 1220 RX DATA and 1222 TX DATA for detecting signal strength, for detecting receive data and for sending transmit data, respectively, used in operation of cellular transceiver 1232. When operating as a impulse radio telephone, control signals 1248 and 1256 of microcomputer 1206 enable impulse radio receiver 1238 and impulse radio transmitter 1254, respectively. In addition to control signals 1248 and 1256 to impulse radio transceiver 1234, microcomputer 1206 also monitors control signals 1246 SIGNAL QUALITY, 1244 RING, 1242 RX SECURITY CODE and 1240 TX SECURITY CODE for detecting signal strength, ringing, and the receive security code, and for sending the transmit security code and dialed digits, respectively, used in operation of impulse radio transceiver 1234. Dialed digits may also be encoded by keypad 1204 as conventional multi-frequency tones which are coupled to transmit audio of impulse radio transceiver 1234 by audio switch 1250 during impulse radio operation.

Referring next to FIG. 13, there is illustrated a block diagram of another embodiment of a impulse radio cellular telephone (IRCT) 1200 according to the present invention. IRCT 1300 includes a impulse radio transceiver 1302 in a separate housing with antenna 1304 and connector 1310, and a cellular telephone 1314 in a separate housing and including impulse radio transmitter 1336 and impulse radio receiver 1306 as well as antenna 1308 and connector 1312. Impulse radio telephone transceiver 1302 may be a plug-in accessory which couples via connectors 1310 and 1312 to cellular telephone 1314. When impulse radio telephone transceiver 1302 is plugged into microcomputer 1316 of cellular telephone 1314, it operates in accordance with FIGS. 14–18. Cellular telephone 1314 includes cellular transmitter 1322, cellular receiver 1324, microcomputer 1316, keypad 1318, display 1320, audio circuitry 1326, audio switch 1328 and handset 1334 including speaker 1332 and microphone 1330. Impulse radio telephone transceiver 1302 is an impulse radio transceiver as described above and in the impulse radio documents incorporated herein by reference. Cellular/PCS telephone 1314 may be any commercially available cellular transceiver.

Microcomputer 1316 of cellular telephone 1314 is coupled to the impulse radio transceiver 1306 via the same control signals used in FIG. 12. These control signals are TX/RX enable signals, signal quality signal, ring signal and TX/RX security code signals.

Audio circuitry 1326 of cellular telephone 1314 is coupled to audio switch 1328 which can be implemented with two-to-one multiplexing analog switches (see FIG. 19) which select between audio signals from audio circuitry 1326 and impulse radio transceiver 1306.

Referring now to FIG. 14, there is illustrated a flow chart for the process used by the IRCTs 1200 and 1300 in FIGS. 12 and 13, respectively, for placing and receiving cellular and impulse radio telephone calls. Entering at block 1402e user activates the IRCT. The microcomputer 1206 and 1316 monitors both the cellular and impulse radio systems for availability thereof and for incoming and outgoing calls. If the cellular/PCS system and/or impulse radio system are available, a corresponding availability indicator is enabled in display 1202 and 1320. In cellular/PCS systems, the microcomputer scans pre-selected signaling channels to determine if cellular/PCS service is available. Next, at decision block 1404, a check is made to determine if a call has been received. If not, NO branch is taken to decision block 1410 to determine if a call has been initiated by the user of the IRCT. If not, NO branch is taken back to block 1404 to continue monitoring both the cellular/PCS and impulse radio systems for telephone calls.

Returning to decision block 1404, if an incoming call has been received, YES branch is taken to decision block 1406 where a check is made to determine if the incoming call is a cellular/PCS call. If so, YES branch is taken to block 1408 where a cellular/PCS call indicator is activated or entered in display 1202 and 1320, and the incoming call is connected as a cellular/PCS call (e.g., in FIG. 12, cellular/PCS transceiver 1232 is enabled by microcomputer 1206). If the incoming call is not a cellular call, NO branch is taken from block 1406 to block 1414 where an impulse radio call indicator is activated or entered in display 1202 and 1320, and the incoming call is connected as a impulse radio call (e.g., in FIG. 12, impulse radio transceiver 1234 is enabled by microcomputer 1206).

Returning to decision block 1410, if a call has been initiated by the user of the IRCT, YES branch is taken to decision block 1412 where a check is made to determine if the initiated call is a cellular call. If so, YES branch is taken to block 1408 where the initiated call is connected as a cellular call. If the initiated call is not a cellular call, NO branch is taken from decision block 1412 to block 1414 where the initiated call is connected as a impulse radio call.

Referring now to FIG. 5, there is illustrated a flow chart for the process used by the IRCTs 1200 and 1300 in FIGS. 12 and 13, respectively, for originating a telephone call as a cellular telephone call or a impulse radio telephone call according to user selectable preference or sequence, stored therein.

Entering at block 1502, the user activates the IRCT. Next, at block 1506, a check is made to determine if a call has been originated by the IRCT. If not, NO branch is taken to wait for a call to be originated. If a call has been originated, YES branch is taken from decision block 1506 to decision block 1508, where a check is made to determine if the user's preference is for impulse radio phone operation. If not, NO branch is taken to block 1510 to determine if a call can be placed on the cellular/PCS system. If so, YES branch is taken to block 1516 where the call origination is connected as a cellular/PCS call. If not, NO branch is taken to decision block 1512 to determine if a call can be successfully placed on the impulse radio system. Referring back to decision block 1508, if preference is for impulse radio, YES branch is also taken to decision block 1512. If an impulse radio call can be successfully placed, YES branch is taken from decision block 1512 to block 1514 where the call is connected as an impulse radio call. If not, NO branch is taken to decision block 1504 to determine if a call had been tried unsuccessfully on the cellular system. If so, YES branch is taken to block 1506 to wait for a call origination. If not, NO branch is taken to decision block 1510 to determine if the call can be placed on the cellular system.

Referring now to FIG. 16, there is illustrated a flow chart for the process used by the IRCTs 1200 and 1300 in FIGS. 12 and 13, respectively, for receiving a telephone call as a cellular telephone call or a impulse radio telephone call according to user selectable preference.

Entering at block 1600, the user activates the IRCT. Next, at decision block 1602, a check is made to determine if a call is being received by the IRCT. If not, NO branch is taken back to decision block 1602. If a call has been received, YES branch is taken from decision block 1602 to decision block 1604 to determine if the user's system preference matches the system of the incoming call. If so, YES branch is taken to decision block 1608 to determine if the call is on the impulse radio system. If so, the YES branch is taken to block 1610 where the incoming call is connected as a impulse radio call. If not, the NO branch is taken to block 1624 where the incoming call is connected as a cellular/PCS call.

Returning to decision block 1604, if the user's system preference does not match the system of the incoming call, NO branch is taken to decision block 1606 to determine if the preference is for the impulse radio system. If so, the YES branch is taken to decision block 1614 to determine if the IRCT is within range of the impulse radio base station (e.g., by sending the transmit security code and waiting for the receive security code from the impulse radio base station). If not, the NO branch is taken to block 1624 where the incoming call is connected as a cellular/PCS call. If the cellular impulse radio telephone is within range of the impulse radio base station, YES branch is taken from decision block 1614 to decision block 1616 to determine if the cellular system will forward the unanswered incoming call to the landline of the impulse radio base station when the cellular phone cannot be reached. This type of service is generally referred to as "call forwarding" (a process which redirects a call from the dialed cellular telephone number of IRCT 1112 to the landline telephone number of impulse radio base station 1104) and can be determined by polling stored information in the memory associated with the IRCT microcomputer. "Call forwarding" of unanswered cellular telephone calls is a conventional service, also referred to as "call transfer" or "no-answer", provided by control terminals 1116 of conventional cellular telephone systems. If not, NO branch is taken to block 1624 where the incoming call is connected as a cellular call. If the cellular system will forward the unanswered incoming call, YES branch is taken from decision block 1616 to block 1620 where the cellular page from the cellular base station is ignored and thereafter to decision block 1602 to wait for the incoming call to be received as a impulse radio call.

Returning to decision block 1606, if the preference is for a cellular call, NO branch is taken to decision block 1612 to determine if the IRCT is within range of the cellular base stations (i.e., Does it have cellular service?). This is typically determined by scanning and selecting the strongest signaling channel from the surrounding cellular base stations. If not, NO branch is taken to block 1610, where the incoming call is connected as a impulse radio call. If the IRCT is within range of the cellular base stations, YES branch is taken from decision block 1612 to decision block 1618 to determine if the landline system will forward the unanswered incoming call to the cellular system. This type of service is generally referred to as "call forwarding" and can be determined by polling stored information in the memory associated with the IRCT microcomputer. If not, NO branch is taken to block 1610 where the incoming call is connected as a impulse radio call. If the landline telephone system will forward the unanswered incoming call, YES branch is taken from decision block 1618 to block 1622 where the impulse radio page from the impulse radio base station is ignored and thereafter back to decision block 1602 to wait for the incoming call to be received as a cellular/PCS call.

Referring now to FIG. 17, there is illustrated a flow chart for the process used by the IRCTs 1200 and 1300 in FIGS. 12 and 13, respectively, for simultaneously processing both a cellular/PCS telephone call and an impulse radio telephone call and, if desired, three-way linking both calls.

Entering at block 1702, the user activates the IRCT. Next, at block 1704, one call is assumed to be in process on either the cellular/PCS system or impulse radio system. Proceeding from block 1704 to decision block 1706, a check is made to determine if a call has been received on the opposite system from the call in process. If so, YES branch is taken to decision block 1710 to determine if the user has selected the dual-mode feature (e.g., by entering a predetermined code from the keypad). If not, NO branch is taken back to decision block 1706 and the current call remains in process. If the user has selected the dual-mode feature, YES branch is taken from decision block 1710 to block 1712 which alerts the user of an incoming call on the alternate system. This type of service is generally referred to as "call waiting". Next, at decision block 1714, a check is made to see if the user acknowledges the second call. If not, NO branch is taken back to decision block 1706 and the current call remains in process. If the user acknowledges the second call (e.g., by flashing the hookswitch), YES branch is taken from decision block 1714 to decision block 1716 to determine if the user has selected three-way linking (e.g., by entering a predetermined code from the keypad). If so, YES branch is taken to block 1718 which enables three-way linking of the user and the two calls, each of which is on a different system. Three-way linking may be accomplished by switchably coupling the combined receive audio signals from summing amplifier 1900 via analog gate 1914 to the speaker, and enabling both transmit audio switches 1908 and 1912 in FIG. 19. If the user has not selected three-way linking, NO branch is taken from decision block 1716 to block 1720 to process both calls simultaneously, one over each system, but selection between them is made by the user so that only one party is in conversation with the user at a time. Selection is made by preprogrammed set of keys on the keypad.

Returning to decision block 1706, if a call has not been received on the opposite system, NO branch is taken to decision block 1708 to determine if a call has been originated on the opposite system. If not, NO branch is taken back to decision block 1706. If a call has been originated on the opposite system, YES branch is taken from decision block 1708 to decision block 1716 to determine if the user wants three-way linking, as described hereinabove.

Referring now to FIG. 18, there is illustrated a flow chart for the process used by the IRCTs 1200 and 1300 in FIGS. 12 and 13, respectively, for automatically transferring between a cellular/PCS telephone call and an impulse radio telephone call. Entering at block 1802, the user activates the IRCT. Next at block 1804, a call is assumed to be in process on one of the two systems. Proceeding from block 1804 to decision block 1806, a check is made to determine if the call in process is on the impulse radio system. If so, YES branch is taken to decision block 1810 to determine if the IRCT is still within range of the impulse radio base stations (e.g., signal quality is good). If so, YES branch is taken back to decision block 1806. If the cellular/PCS impulse radio telephone is out of range of the impulse radio base stations, NO branch is taken from decision block 1810 to decision block 1814 to determine if the user has selected transfer of the impulse radio call to the cellular/PCS system (e.g., by entering a predetermined code from the keypad). If so, YES branch is taken to block 1822 where an attempt is made to transfer the impulse radio call to the cellular system. Assuming the called party has "call waiting", the transfer is attempted by placing another call on the cellular system and waiting for the called party to answer. Thereafter, the path returns to decision block 1806. If the user has not selected call transfer, NO branch is taken from decision block 1814 to block 1818 where the impulse radio call is maintained as long as possible.

Returning to decision block 1806, if the call is not on the impulse radio system, NO branch is taken to decision block 1808 to determine if the IRCT is still within range of the cellular base stations (e.g., signal quality is good). If so, YES branch is taken back to decision block 1806. If the IRCT is out of range of the cellular/PCS base stations, NO branch is taken from decision block 1808 to decision block 1812 to determine if the user has selected transfer of the cellular call to the impulse radio system (e.g., by entering a predetermined code from the keypad). If not, NO branch is taken to block 1816 where the cellular/PCS call is maintained as long as possible. If the user has selected call transfer, YES branch is taken from decision block 1812 to block 1820 where an attempt is made to transfer the cellular/PCS call to the impulse radio system. Assuming the called party has "call waiting", the transfer is attempted by placing another call on the impulse radio system and waiting for the called party to answer. Thereafter, the path returns to decision block 1806.

In summary, a unique impulse radio cellular telephone has been described that may be advantageously utilized for making both cellular telephone calls and impulse radio telephone calls. Whenever the cellular impulse radio telephone is within range of the impulse radio base station, telephone calls are preferably originated on the impulse radio system, or if currently in process, are transferred to the impulse radio telephone system. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. An impulse radio mobile communications system, comprising:
    a first impulse radio transmitter means interfaced with a voice or data communication network;
    a first impulse radio receiver receiving voice or data information from said first impulse radio transmitter means.
    a second impulse radio transmitter in communication with a second impulse radio receiver;
    said second impulse radio receiver in communication with said first impulse radio transmitter; and
    at least one non-impulse radio wireless communication means interfaced with said second impulse radio transmitter and said first impulse radio receiver by an interface, said interface provides for the switching between said at least one non-impulse radio wireless communication means and said second impulse radio transmitter and said first impulse radio receiver.

2. The impulse radio mobile communication system of claim 1, wherein said switching between said at least one non-impulse radio wireless communication means and said second impulse radio transmitter and said first impulse radio receiver occurs automatically based on the signal strength of said non-impulse radio wireless communication means and the signal strength of said impulse radio communications.

3. The impulse radio mobile communication system of claim 1, wherein said switching between said at least one non-impulse radio wireless communication means and said second impulse radio transmitter and said first impulse radio receiver is manually selected by a user.

4. The impulse radio mobile communication system of claim 3, wherein said first impulse radio transmitter and said second impulse radio receiver are contained in a base station networked within a plurality of impulse radio base stations, said plurality of impulse radio base stations providing communication coverage for a given area.

5. The impulse radio mobile communication system of claim 3, further comprising a signal strength detection means, said signal strength detection means detecting the strength of cellular/PCS wireless communication signals as well as impulse radio communication signals.

6. The impulse radio mobile communication system of claim 3, further comprising a microprocessor for controlling communication functions, said microprocessor controlling audio circuitry associated with said second impulse radio transmitter and said first impulse radio receiver and audio circuitry associated with a Cellular/PCS transmitter and a CellularPCS receiver, wherein when said signal detection means detects a weak signal in an impulse radio transmission, the microprocessor directs said audio circuitry of said cellular PCS transceiver to be activated by way of an audio switch.

7. The impulse radio mobile communication system of claim 3, further comprising a microprocessor for controlling communication functions, said microprocessor controlling audio circuitry associated with said second impulse radio transmitter and said first impulse radio receiver and audio circuitry associated with a Cellular/PCS transmitter and a CellularPCS receiver, wherein when said signal detection means detects a signal of sufficient strength to communicate via an impulse radio communication means, ongoing Cellular/PCS communications are automatically switched to impulse radio communications.

8. The impulse radio mobile communication system of claim 1, wherein said voice or data communication network is a land line network.

9. The impulse radio mobile communication system of claim 1, wherein said voice or data communications network is a cellular wireless network.

10. The impulse radio mobile communication system of claim 1, wherein said voice or data communication system is a PCS wireless network.

11. The impulse radio mobile communication system of claim 1, wherein said first impulse radio receiver is contained in a plug in accessory to a cellular or PCS telephone.

12. The impulse radio mobile communication system of claim 1, wherein said impulse radio transceiver is operably integrated into a handset capable of cellular, PCS or impulse radio communications.

13. The impulse radio mobile communication system of claim 1, wherein said switching between said at least one non-impulse radio wireless communication means and said second impulse radio transmitter and said first impulse radio receiver occurs automatically based on a predetermined distance from said first impulse radio transmitter to said second impulse radio transmitter as determined utilizing impulse radio distance determination techniques.

* * * * *